Oct. 5, 1948.　　　　H. M. HEIMARK　　　　2,450,796
WEED GUARD FOR FISHHOOKS
Filed June 13, 1947
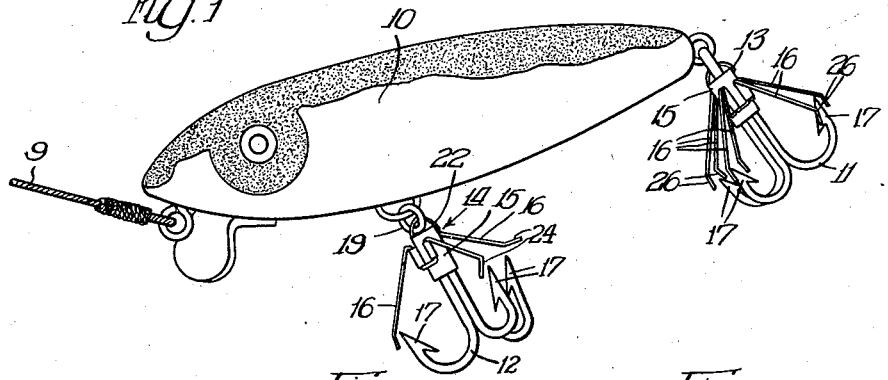
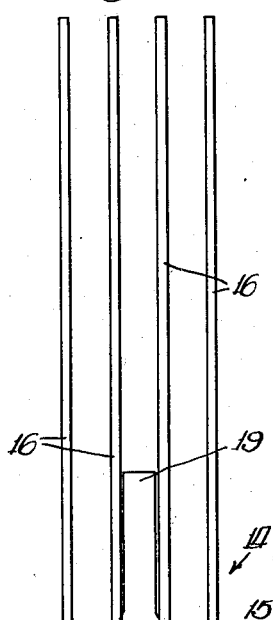
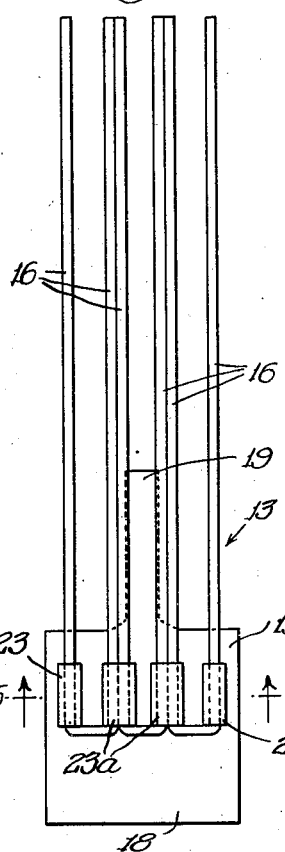
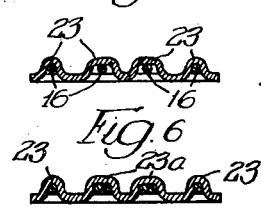
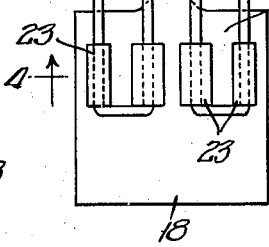
INVENTOR.
Harold M. Heimark,
BY
Forman L. Mueller
Atty.

Patented Oct. 5, 1948

2,450,796

UNITED STATES PATENT OFFICE 2,450,796

WEED GUARD FOR FISHHOOKS

Harold M. Heimark, Oak Park, Ill.

Application June 13, 1947, Serial No. 754,487

5 Claims. (Cl. 43—38)

1

This invention relates generally to weed guards for fishhooks and in particular to fishhook guards which can be removably secured to standard multiple hooks.

It is well known that standard multiple fishhooks when used on various spoons or plugs cannot be satisfactorily used in bodies of water where weeds grow thickly. Various methods have been attempted to overcome this difficulty such as the provision of a special hook having a weed guard built as a unit with the hook. This results in a relatively expensive unit as a special hook is required, and also the entire unit must be replaced when either the hook or the guard is damaged as the guard is not removable from the hook.

It is, therefore, an object of this invention to provide a simple weed guard which can be easily assembled and disassembled from a standard fishhook.

A further object of this invention is to provide an inexpensive weed guard for use with a standard multiple hook.

A feature of this invention is the provision of a weed guard for a fishhook having a clamp made of soft metal which can be formed about the shank of the hook and fingers made of fine stiff wire which can be positioned adjacent the point of the fishhook.

A further feature of this invention is the provision of a guard for a fishhook having a clamp with a projection thereon adapted to be positioned in the eye of the hook and a rectangular portion adapted to be formed about the shank of the hook, the clamp being made of soft metal so that it can be easily assembled on a standard hook and disassembled therefrom without special apparatus or tools.

Further objects, features and advantages will be apparent form a consideration of the following description taken in connection with the accompanying drawings in which:

Fig. 1 is a perspective view of a lure having guards in accordance with the invention secured to the hooks thereof;

Fig. 2 illustrates the manner in which the weed guard in accordance with the invention is secured to a fishhook;

Fig. 3 is an enlarged view of a guard in accordance with the invention showing the construction thereof;

Fig. 4 is a cross-sectional view along the lines 4—4 of Fig. 3;

Fig. 5 is an enlarged view of a modified weed guard; and

2

Fig. 6 is a cross-sectional view along the lines 6—6 of Fig. 5.

In practicing the invention, there is provided a weed guard for use with standard fishhooks comprising a clamp member having a plurality of resilient fingers secured thereto. The clamp has a rectangular portion with an integral tongue secured thereto and is adapted to be secured to a fishhook by placing the tongue through the eyelet thereof and forming the rectangular portion about the shank of the hook. The resilient fingers are made of spring wire and are secured in loops formed in the clamp. After the clamp is secured to the hook the resilient fingers may be bent to be positioned adjacent the points of the hook and are effective to prevent the points of the hook from becoming entangled in weeds and the like.

Referring now to Fig. 1, there is illustrated a plug 10 secured to a line 9 and having two triple hooks 11 and 12 secured thereto. Guards 13 and 14 in accordance with the invention are secured to the hooks 11 and 12, respectively, each of the guards including a clamp portion 15 and a plurality of fingers 16. The guard 13 includes 6 fingers so that two fingers are provided for each point 17 of the hook 11. The guard 14 includes only one finger 16 for each point 17 of the hook 12. It is to be pointed out that the invention is not limited to use with a plug as shown in Fig. 1 but is applicable for use on almost all standard hooks used either alone or with any type of lure.

Referring now to Figs. 2, 3 and 4, the specific construction of the guard 14 and the manner in which it is secured to the hook 12 is illustrated. The clamp portion 15 of the guard may be punched from soft brass and includes a rectangular portion 18 and a tongue 19 which is integral therewith. As clearly shown in Fig. 2, to apply the guard 14 to the hook 12, the tongue 19 is bent so that it may be inserted in the eyelet 20 of the hook 12, and the rectangular portion 18 is formed so that it can be secured to the shank 21 of the hook. After the rectangular portion 18 has been tightly wrapped about the shank 21, the end 22 of the tongue 19 can be bent down over the joint where the ends of the portion 18 meet as is shown in Fig. 1. As previously stated the guard 14 includes a single finger 16 for each point 17 of the hook. These fingers are formed of spring wire and are secured to the clamp 15 by being threaded in loops 23 formed in the rectangular portion 18 thereof. This structure is clearly shown in Figs. 3 and 4. It is noted that the wires are positioned so that when the clamp is secured to the hook, the fingers 16 extend away from the hook. The fingers are then bent backwardly to be positioned adjacent the points 17 of the hook. This prevents movement of the wires in the loops 23 of the clamp 15. The ends of the fingers are bent to form end portions 24 which extend in front of the points of the hook to prevent tangling of the hook in weeds or the like. When the guard as illustrated in Fig. 3 is used with a triple hook, such as 12, only three fingers 16 will be required and one spring wire end can be clipped as illustrated at 25 in Fig. 2.

As previously stated, the weed guard in accordance with the invention may include a pair of fingers for each point 17 of the hook. This structure is illustrated by the guard 13 shown in Figs. 1, 5 and 6. The guard 13 is generally similar to the guard 14 having a clamp 15 with a rectangular portion 18 and a projecting tongue 19. However, two wire fingers are placed in each of the center loops 23 which are indicated as 23a in Figs. 5 and 6. This results in three pieces of spring wire being secured to the clamp providing six fingers 16. When the guard is secured to a triple hook, these fingers may be positioned on either side of the points 17 of the hook and have the ends 26 thereof bent down to follow generally the contour of the points of the hook as illustrated in Fig. 1.

Although the clamp portion of the guard has been described as constructed of soft brass, it is apparent that any other material can be used which can be easily formed so that the guard can be assembled to a hook, disassembled therefrom and then reassembled on a different hook without the use of special assembling tools. This makes it possible to assemble the guard on a hook or change the guard from one hook to another while on a fishing trip and thereby reduce the amount of extra equipment which must be carried. The fingers which actually form the guards are preferably made of spring wire but may be made of any other material which can be bent in the manner described and is sufficiently stiff to form an effective guard.

The weed guard in accordance with the invention is of simple and inexpensive construction. The clamp portion is formed by a single punching operation and the spring wires are merely cut and threaded through the loops formed in the clamp. The guard has been found very effective as the clamp can be securely fastened to the hook so that the fingers retain their position with respect to the points of the hook and are effective to prevent entangling of the hook in weeds or other foreign material.

While I have described certain embodiments of my invention, it is apparent that various changes and modifications can be made therein without departing from the intended scope of the invention as defined in the appended claims.

I claim:

1. A weed guard for use with a multiple fishhook, comprising a clamp having a tongue thereon and having loops formed therein, and resilient fingers secured to said loops, said clamp being made of soft metal so that said guard can be removably secured to a hook by placing said tongue through the eye of said hook and forming the clamp about the shank of said hook, said fingers being made of spring wire and positioned adjacent the points of said hook.

2. A weed guard for use with a multiple fishhook, comprising a clamp having a base portion and a tongue thereon, said base portion having loops formed therein, and resilient fingers secured to said loops, said guard being adapted to be secured to a hook by placing said tongue through the eye of said hook and bending said base portion of said clamp about the shank of said hook with the resilient fingers positioned adjacent the points of said hook to prevent tangling of said hook in weeds or the like.

3. A weed guard adapted to be removably secured to a multiple fishhook comprising a clamp having an integral tongue thereon and having loops formed therein, and spring wire fingers secured in said loops.

4. A weed guard for use with a fishhook including a plurality of points and a shank and eye for anchoring the same, comprising a clamp including a rectangular portion engaging around the shank of said hook and an integral tongue projecting from said rectangular portion and adapted to be positioned in the eye of said hook, and a plurality of resilient fingers secured to said rectangular portion, said fingers being adapted to be positioned adjacent the points of said hook.

5. A weed guard for use with a fishhook comprising a clamp made of soft metal and including a rectangular portion extending around the shank of said hook, a tongue integral with said rectangular portion and adapted to be positioned in the eye of said hook, and a plurality of fingers made of spring wire secured to said rectangular portion and adapted to extend adjacent the point of said hook to prevent tangling of said hook in weeds or the like.

HAROLD M. HEIMARK.

REFERENCES CITED

The following references are of record in the file of this patent:

UNITED STATES PATENTS

| Number | Name | Date |
|---|---|---|
| 539,149 | Shattuck | May 14, 1895 |
| 2,414,425 | Tallaksen | Jan. 14, 1947 |

FOREIGN PATENTS

| Number | Country | Date |
|---|---|---|
| 727,270 | France | June 15, 1932 |